Patented Apr. 19, 1938

2,114,467

UNITED STATES PATENT OFFICE 2,114,467

IMPROVED PROCESS FOR SEPARATING WAX FROM HYDROCARBON OILS CONTAINING THE SAME

Stewart C. Fulton, Elizabeth, and James M. Whiteley, Roselle, N. J., assignors to Standard Oil Development Company, a corporation of Delaware No Drawing. Application December 1, 1932, Serial No. 645,232

7 Claims. (Cl. 196—18)

The present invention relates to the art of producing improved lubricating oils and more specifically of lubricating oils of low pour point by removal of solid or semi-solid waxy constituents therefrom. Our invention will be fully understood from the following description of the method.

Lubricating oils obtained from petroleum often contain a considerable quantity of solid or semi-solid waxy constituents which cause the oil to solidify or cease to flow at relatively high temperatures, say 25°, 35°, 50° or even 75° F. and except for this failure to pour or flow these same oils would be useful as lubricants at considerably lower temperatures. It has been the practice of refiners to remove wax from oils by filtration, settling or centrifuging after the oil has been chilled to a temperature below the wax separation point. Waxes of good firm crystalline structure are ordinarily removed by filtration, but the so-called amorphous waxes, petrolatum, cannot be filtered or, at least, only with considerable difficulty and this type of wax is ordinarily removed either by cold settling or by cold centrifuging of a dilute oil-wax mixture.

We have discovered a substance or, rather, a class of substances which have proved to be of great value in the separation of oil-wax mixtures. These materials may be termed separation aids but must not be confused with the insoluble clays, such as fuller's earth or fine silica which have been used to improve the condition of the waxy cake during filtration. Our materials are freely soluble in the oil and are used in relatively minute amounts. While the action is obscure at the present time we believe that it has to do with the phenomena of solvation, that is to say, its presence even in small amount decreases the degree to which the wax is solvated producing drier particles which are more readily removed. However, we have found that these materials when present in relatively small amounts, say .1 to 1% based on the undiluted wax-containing oil, separation of wax occurs with much greater ease and the rate of chilling of the oil-wax mixture may be greatly increased.

Our materials are produced from a great variety of sources, for example from various crude oil fractions and particularly the distillates from naphthenic oils or those with cyclic structures. Cracked oils are especially desirable as a source of these improved filtration aids and particularly the heavy cracked oils such as the tars produced by the well known cracking processes. When these materials are used it is most desirable to discard the darker colored tarry residue and to use only the distillate therefrom which may boil above 650 or even 700° F. under atmospheric pressure. Such a distillate is pale in color and produces an excellent grade of separation material by the method that will be outlined below. Aromatic or cyclic fractions may be obtained from crude oils of various cuts by treatment with selective solvents of the class of liquid sulphur dioxide, phenol, furfural, nitrobenzene and the like and these extracts are also an excellent source for the separation aid. Coal tar products may likewise be used and preferably the distillates such as napthalene, anthracene, carbazol, anthracene oil or mixtures of these materials which are preferably freed from the darker colored pitches or tarry constituents. Hydrogenated tar or oil fractions may also be used.

In producing our separation aid from the various materials enumerated above it will be understood that slightly different methods may be used, but in general they are substantially the same. In any case the oil is treated with a catalyst of the type of aluminum chloride including its well known equivalents such as zinc chloride and the active clays and other earths in proportion of about 2 to 10%. When 2 to 5% of an anhydrous chloride is used the mixture is maintained at a polymerizing temperature for a prolonged period, for example, at least two hours. By polymerizing temperature we mean a temperature at which internal rearrangements occur but at which light oil formation is negligible. Generally temperatures of about 400 to 450° F. are most suitable and we find it desirable to keep the mass in a state of thorough agitation during the polymerizing stage.

The polymerization period may be considerably longer than two hours, and if prolonged to say 10 or 12 hours a separation aid of high activity results. We have found that the polymerization time may be reduced to 2 or 3 hours by rapidly heating at the end of that time to a splitting temperature of above about 500° or 600° F. If the rise in temperature is carried out at too slow a rate there is an excessive formation of light oil and an inactive sludge, and we have found that a 10 to 30 minute period of heating to reach the splitting temperature is satisfactory, and circulation through a heating coil furnishes a satisfactory method of quickly attaining the desired temperature. The mass is then allowed to cool and the sludge settles to a layer from which the oil may be decanted with ease. The purpose of this heating step is to break the aluminum chloride complex, to bring about other obscure rearrangements and to split off the separation aid which then remains dissolved in the oil. If the quantity of aluminum chloride is in excess of about 5% we have found that the complex is not completely split by the heating step and consequently some of the valuable separation aid may not be separated from the sludge, but when larger quantities of aluminum chloride, say 8 to 10% are used substantially the entire quantity of separation aid is firmly held in the sludge in spite of the heating step. This step is included, however, although it is generally only necessary to heat to 500 or 550° F., whereas for the previous method temperatures of 600 or above are preferred. The aluminous sludge may be removed by other methods. It will be seen, therefore, that depending on the conditions of operation the separation aid may be recovered from the oil itself or from the sludge separated therefrom or from both components. It is generally found, however, that the conditions may be so adjusted as to recover substantially the entire amount of the separation aid from the one or the other of these two sources.

In working up the oily layer it may be purified by treatment with clay, with acid or with alkali by well known methods and it may in some instances be sufficiently concentrated to be effective, but it is almost always desirable to further concentrate in order to produce a more powerful separation aid and we prefer to recover the latter in a solid state. This may be done by distilling off the oil and recovering the desirable material as a residue. The distillation is preferably carried out under vacuum in order to prevent decomposition.

In working up the sludge we have found it desirable to break the aluminum chloride complex by means of water, acid, or preferably with alkali while heating to a temperature of about 200 or 250° F. This effectively liberates the separation aid and the latter may be extracted from the solid mass by solvents such as naphthas or benzol or toluol and the like, and the solid separation aid may be obtained therefrom by distillation of the solvent.

The solid recovered varies in color from yellow to dark red or brown, or black, depending on the source of the oil and the method with which it is made or recovered. That recovered by our preferred method from sludge by alkali splitting is darker in color but is more satisfactory because of its extreme potency. The solid generally has a molecular weight in the neighborhood of 350, although this may vary. It is soluble, or at least highly dispersible in chloroform, aromatic hydrocarbons such as benzol and toluol and in heavy oils such as lubricating oils, and heavy naphthas, benzene, gas oil, but it is only partially soluble in hot petroleum ether, alcohols, ketones and the like. These latter solvents appear to dissolve inert constituents leaving an even more powerful separation aid. For example, the solid residue left from a distillation under high vacuum may be dissolved to the extent of about 85% with acetone. The 15% remaining is a very active separation aid, many times more powerful than the unextracted solid. The solid wax separation aid appears to be a hydrocarbon, for example an ultimate analysis shows the following results:

Percent carbon_____ 91.72
Percent hydrogen_____ 6.79

In a particular case the balance appeared to be sulphur, but in other similar tests it was found that the carbon-hydrogen ratio did not vary much although the amount of sulphur varied considerably, indicating that the sulphur was not an ingredient of the active principle. The oil itself may be washed and purified in any known method, for example with sulphuric acid or alkalies, or with clay but ordinarily only the clay treatment is desirable.

As outlined above the separation aid is used in relatively small quantities, for example from .01 to 1.0%. There is generally an optimum quantity which produces the best results and it is usually from .05 to .5%. These figures are based on the heavy wax-containing oil and not on the diluted oil. The aid may be added to the oil in a solid form at elevated or room temperature and dissolved by stirring, or it may be dissolved in higher concentration in a part of the oil which is subsequently added to the bulk, or in high concentration in a solvent such as benzol or toluol and added to the waxy oil. It should be thoroughly incorporated by stirring before the oil is chilled for wax separation. The waxy oil is generally diluted to make wax separation easier and as diluents a great many solvent mixtures may be used, for example naphtha or the higher alcohols, ketones, esters such as the acetates and formates and acids such as acetic acid. These are mentioned merely as examples as a great many such solvents are known in the art. Particular mixtures may be especially desirable such as naphtha and ethyl alcohol or benzol or toluol with alcohol or ketones such as acetone or higher ketones. When separation aids are used naphthas can be employed without the oxygenated diluents or wax precipitants with practically the same efficiency as found with these more expensive diluents. The diluted oil is then chilled to the wax separation point and this may be adjusted depending on the particular solvent and the degree of wax removal desired. One advantage of our wax separation aids lies in the fact that oil mixtures may be chilled at a much higher rate than is usual in wax separation. Ordinarily the rate of chilling should not be above 4 or 5° F. per hour, the reason being that quicker chilling often results in the formation of a jell from which the wax cannot be separated by any means. When wax separation aids are used, however, chilling may be carried out at very much more rapid rates, for example at a rate of 25 or 50° per hour or, in fact, as rapidly as the heat can be abstracted in commercial equipment, so rapidly that the term "shock chilling" is appropriate. In some instances it has been observed that shock chilling is even more desirable than slow chilling when separation aids are present, but ordinarily the oil may be chilled slowly if that is preferred. It has likewise been observed that the use of separation aids decreases the amount of solvent generally required for separation by centrifuge or gravity separation. Ordinarily four or five times as much solvent as waxy oil is used, but with the separating aid the ratio can be as low as 2 to 1 or even 1 to 1. The use of a separation aid frequently decreases the amount of solvent substantially so that a greater capacity is obtained from centrifugal machinery.

The means of separating the wax from the oil differs according to the nature of the wax. Filtration is ordinarily employed with well defined wax crystals and ordinarily filtration aids are not considered necessary for such operations but it has been found that the presence of our aids does improve wax filtration and especially in those cases where wax separation by filtration is difficult because of poorly defined wax crystals. For the so-called amorphous waxes or petrolatum separation by centrifugal means or by cold settling is ordinarily used and the separation aids are of greatest advantage in these methods. The use of the present aids makes possible the employment of filters for even the poorest natural pressing stock, such as cylinder oil, petrolatums, and the like.

The following examples illustrate the manner in which our separation aids are produced and the effect on separation of waxes from oils containing the same:

*Example I.*—One part of heavy Ranger petrolatum was dissolved in five parts of 55° A. P. I. naphtha. The mixture was warmed to effect a solution and was then chilled to 20° F. and held at that temperature for 24 hours. Inspection at this time showed no indication whatever of a separation of the oil from the wax. The mass appeared to have set into a gel from which the wax could not be removed either by settling, filtration or by centrifugal means.

*Example II.*—In the second experiment, exactly the same material was used with the same diluent in the same proportions, but various amounts of a separation aid, made as will be indicated below, were added. Chilling was effected as rapidly as possible and the mixture was allowed to stand in a tall vessel to allow settling of the wax. In the table below the volume occupied by the settled wax is given as a percentage of the original oil-wax-diluent volume after 24 hours. The separation aid in this instance was prepared in the following manner: A 10° A. P. I. cracking coil tar was reduced to a solid residue under vacuum and the distillate boiling above 700° F. at atmospheric pressure was collected. To this distillate 5% by weight of anhydrous aluminum chloride was added and the mixture was maintained at a temperature of about 400° F. for a period of three hours during which the mass was continually stirred. The temperature was then raised rapidly to 700° F. and this was accomplished within about 20 minutes time. The small amount of light oil formed during the time at high temperature was removed and separately condensed and the residual oil was allowed to slowly cool to about 250° F. When it had reached this temperature 10% of dry decolorizing clay was added and the oil was filtered to remove the clay. It was then distilled under vacuum using care to prevent decomposition and a solid material was obtained as a residue which represented about 5% of the original distillate.

| Percent separation aid | Final volume percent occupied by settled wax |
|---|---|
| 0.1 | 50 |
| 0.3 | 32 |
| 0.5 | 33 |
| 1.0 | 36 |

In each case the settled wax appeared to be granular and of a dry character so that it could be readily removed either by merely decanting the oil or by filtration.

*Example III.*—In a third experiment the separation aid was produced from the same distillate as used in the experiment above but in this instance 10% of anhydrous aluminum chloride by weight was used and the mixture was maintained for three hours at 400° F. At the end of this time the temperature was rapidly raised to 550° F. and the mass was allowed to slowly cool. A sludgy, semi-solid material settled from the clear oil and the solution was recovered by decanting the oil. The sludge was heated then to about 250° F. and 10% of dry flake caustic soda was then added while the mass was stirred vigorously to effect complete reaction. The mass was then further cooled and was extracted with kerosene from which the separation aid was recovered by distillation of the light constituents. It was recovered with a yield of 25% on the original distillate.

This material when used in connection with the Ranger petrolatum under conditions exactly similar to those of the second experiment gave the results shown in the table below:

| Percent separation aid | Final volume percent occupied by settled wax |
|---|---|
| 0.1 | 27 |
| 0.3 | 24 |
| 0.5 | 25 |

*Example IV.*—In a fourth experiment the dry separation aid obtained in Experiment II was extracted with acetone which was found to remove about 85% of the solid. The 15% remaining was a dark colored residue which had powerful wax separating properties.

The table below indicates its effectiveness:

| Percent separation aid | Final volume percent occupied by settled wax |
|---|---|
| 0.03 | 35 |
| 0.06 | 31 |
| 0.10 | 23 |

*Example V.*—As a fifth experiment, 0.2% of the separation aid shown in the third experiment above was added to one volume of crude Ranger petrolatum. The material was taken up in four volumes of 55° naphtha and the mixture was chilled and filtered at 24° F. It was cooled to about —5° F. and after standing at this temperature for one hour was again filtered. The wax cakes were washed once with naphtha and the solvent distilled from the oil. The yields were as follows:

Percent
Oil (35° F. pour point) _____ 51.0
Oil (washings, 85° F. pour point) _____ 8.3
High melting wax (150° F. melting point) ___ 25.4
Low melting wax (113° F. melting point) ____ 15.3

The oil had the following characteristics:
A. P. I. gravity_____ 26.0
Viscosity at 100° F._____ 1506 seconds Saybolt
Viscosity at 210° F._____ 106 seconds Saybolt
Pour_____ 35° F.

The waxes were dry and granular in structure. The high melting wax was dark in color but after refining in the usual methods with sulfuric acid, became white and of good quality.

*Example VI.*—As a sixth experiment a heavy stock obtained by reducing a hydrogenated Texas oil to a 31% bottoms was selected. It showed the following characteristics:

A. P. I. gravity_____ 27.4
Flash _____ 520° F.
Viscosity at 210° F._____ 71 seconds Saybolt
Pour point_____ 85 to 90° F.

This oil was characterized as an extremely difficult stock from which to remove the wax. To it was added 0.1% of a wax separation aid of the type produced in the third experiment above. It was diluted with 55° naphtha in proportion of 75% diluent to 25% heavy oil. The diluted oil was then chilled to −30° F. and centrifuged at that temperature. 85.5% of oil was recovered having the following characteristics:

A. P. I. gravity _____ 27.1
Flash _____ 520° F.
Viscosity at 210° F. _____ 75 seconds Saybolt
Pour _____ 10° F.

14.5% of a wax having a melting point of 124° F. was also recovered. The wax was dark in color but after the usual refining with sulfuric acid, became white and of good quality.

It was found in other experiments that the amount of diluent naphtha could be greatly reduced for example even to 2:1 or 1:1, at which dilution rapid and efficient separation was possible.

The present invention is not limited to any theory of the action of these separation aids nor to any particular catalytic material nor definite times and temperatures of reaction which might have been given for illustrative purposes, but only to the following claims in which we wish to claim all novelty inherent in our invention.

We claim:

1. An improved process for separating wax from oil containing the same, which comprises adding to the waxy oil a separation aid of the type produced by treating a distillate boiling above about 700° F. at atmospheric pressure and derived from a tar produced by the cracking of hydrocarbon oil with metallic halides for a prolonged period at a polymerizing temperature and then separating the catalytic sludge, chilling the mixture and removing the wax thereby caused to precipitate.

2. An improved process for separating wax from oil containing the same, which comprises adding to the waxy oil a separation aid comprising a polymer produced by treating a vacuum distillate of cracking coil tar with metallic halides for a prolonged period at a polymerizing temperature and then separating the catalytic sludge, chilling the mixture and removing the wax thereby caused to precipitate.

3. An improved process for separating wax from oil containing same which comprises adding to the waxy oil a small quantity of a polymer of the type produced by treating a distillate of cracking coil tar with aluminum chloride at a polymerizing temperature for a prolonged period, then at a splitting temperature for a short period and subsequently removing the aluminous sludge, chilling the mixture and removing the wax thereby caused to precipitate.

4. An improved process for separating wax from mineral oils containing the same which comprises adding to the waxy oil a small quantity of a separation aid of the type produced by the treatment of a distillate obtained from cracking coil tar with aluminum chloride at a polymerizing temperature of about 400° F. for a period in excess of two hours and subsequently removing the aluminum complex by hydrolysis, shock chilling the mixture of oil and separation aid to a temperature at which wax is caused to precipitate and separating the wax from the oil.

5. Process according to claim 4 in which the wax is separated from the oil by gravity settling.

6. Process according to claim 4 in which the wax is separated from the oil by centrifugal means.

7. Process according to claim 4 in which the wax is separated from the oil by filtration.

STEWART C. FULTON.
JAMES M. WHITELEY.